US011714434B2

(12) United States Patent
Gyoutoku et al.

(10) Patent No.: US 11,714,434 B2
(45) Date of Patent: Aug. 1, 2023

(54) GAS SAFETY DEVICE (71) Applicant: Panasonic Intellectual Property Management Co., Ltd., Osaka (JP)

(72) Inventors: Taiti Gyoutoku, Kyoto (JP); Kenji Yasuda, Kyoto (JP); Kenta Uchida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 13 days.

(21) Appl. No.: 17/599,538

(22) PCT Filed: May 13, 2020

(86) PCT No.: PCT/JP2020/019151
§ 371 (c)(1),
(2) Date: Sep. 28, 2021

(87) PCT Pub. No.: WO2020/235422
PCT Pub. Date: Nov. 26, 2020

(65) Prior Publication Data
US 2022/0147069 A1 May 12, 2022

(30) Foreign Application Priority Data
May 17, 2019 (JP) ................................ 2019-093462

(51) Int. Cl.
*G05D 7/06* (2006.01)
*G01F 1/66* (2022.01)
(Continued)

(52) U.S. Cl.
CPC ............. *G05D 7/0635* (2013.01); *G01F 1/66* (2013.01); *G01L 15/00* (2013.01); *G01F 1/72* (2013.01);
(Continued)

(58) Field of Classification Search
CPC .......... G05D 7/0635; G01F 1/66; G01F 1/72; G01F 15/002; G01F 15/005; G01L 15/00; G01M 3/2815
(Continued)

(56) References Cited

U.S. PATENT DOCUMENTS 5,911,238 A * 6/1999 Bump ...................... G01F 25/13
73/204.15
8,794,261 B2 * 8/2014 Watanabe ................. F17D 3/00
137/486

(Continued)

FOREIGN PATENT DOCUMENTS

JP 2014-098563 5/2014

OTHER PUBLICATIONS

International Search Report of PCT application No. PCT/JP2020/019151 dated Aug. 4, 2020.

*Primary Examiner* — Minh Q Le
(74) *Attorney, Agent, or Firm* — Wenderoth, Lind & Ponack, L.L.P.

(57) ABSTRACT

A gas safety device includes flow path, shutoff valve that shuts off flow path, flow rate measurement unit that measures a flow rate of gas, gas-side absolute pressure sensor that measures absolute pressure of the gas, atmosphere-side absolute pressure sensor that measures absolute pressure of atmospheric pressure, and pressure value transition detector that detects a transition state of the absolute pressure measured by gas-side absolute pressure sensor. Further provided are sensor drive controller that controls driving of atmosphere-side absolute pressure sensor in accordance with a value of pressure transition in pressure value transition detector, and gas pressure determination unit that calculates gas supply pressure from a difference between pressure values measured when the two sensors are driven. Control circuit is further provided to shut off flow path with shutoff (Continued)

valve when determining anomaly from a flow rate measured by flow rate measurement unit and gas supply pressure calculated by gas pressure determination unit.

6 Claims, 4 Drawing Sheets

(51) Int. Cl.
*G01L 15/00* (2006.01)
*G01F 15/00* (2006.01)
*G01F 1/72* (2006.01)
*G01M 3/28* (2006.01)

(52) U.S. Cl.
CPC .......... *G01F 15/002* (2013.01); *G01F 15/005* (2013.01); *G01M 3/2815* (2013.01)

(58) Field of Classification Search
USPC .............................................. 137/486, 487.5
See application file for complete search history.

(56) References Cited

U.S. PATENT DOCUMENTS

| | | | |
|---|---|---|---|
| 10,437,264 B2* | 10/2019 | Kehoe | G05D 7/0635 |
| 2014/0374634 A1* | 12/2014 | Ohtsuki | F16K 7/123 |
| | | | 700/282 |
| 2015/0260565 A1* | 9/2015 | Smirnov | G05D 7/0635 |
| | | | 73/1.34 |
| 2017/0115150 A1* | 4/2017 | Ikeuchi | G01F 1/6842 |
| 2018/0173249 A1* | 6/2018 | Hayashi | G05D 7/0635 |
| 2018/0274956 A1* | 9/2018 | Miller | G01F 1/363 |
| 2019/0050003 A1* | 2/2019 | Banares | G05D 7/0635 |
| 2019/0204133 A1* | 7/2019 | Somani | G01F 1/692 |
| 2019/0242493 A1* | 8/2019 | Nishikawa | F16K 37/0041 |
| 2020/0033895 A1* | 1/2020 | Sugita | G01F 1/363 |
| 2020/0073414 A1* | 3/2020 | Lull | G05B 17/02 |
| 2021/0010894 A1* | 1/2021 | Fujii | G01F 1/72 |
| 2021/0064067 A1* | 3/2021 | Smirnov | G01F 15/024 |
| 2021/0116945 A1* | 4/2021 | Kayaba | G01L 13/00 |
| 2021/0173388 A1* | 6/2021 | Takijiri | G01F 25/10 |

* cited by examiner

GAS SAFETY DEVICE

CROSS-REFERENCE TO RELATED APPLICATIONS

This application is a U.S. national stage application of the PCT International Application No. PCT/JP2020/019151 filed on May 13, 2020, which claims the benefit of foreign priority of Japanese patent application No. 2019-093462 filed on May 17, 2019, the contents all of which are incorporated herein by reference.

TECHNICAL FIELD

The present disclosure relates to a gas safety device that ensures safety in gas use by measuring a gas flow rate and shutting off a gas passage when an abnormal flow rate is measured.

BACKGROUND ART

There has been conventionally proposed a gas safety device including a gas meter that measures the amount of gas usage and determines anomaly to cut off a gas passage to ensure safety (see Unexamined Japanese Patent Publication No. 2014-98563). The gas safety device includes an ultrasonic flow rate measurement unit in which an ultrasonic sensor and a circuit board provided with an ultrasonic sensor drive circuit are integrated, and a pressure sensor that measures differential pressure between supply pressure and atmospheric pressure. The gas safety device further includes a control function of cutting off a flow path and stopping supply of gas, and a function of warning, when it is determined that the differential pressure between the supply pressure and the atmospheric pressure measured by the pressure sensor is abnormal.

The pressure sensor incorporated in the gas safety device is a differential pressure measurement type that measures pressure of gas on the basis of atmospheric pressure, so that the pressure sensor has a through-hole through which the gas is introduced into the pressure sensor, and thus the gas may leak from the through-hole when temperature around the gas safety device excessively increases. Thus, examples of structure that does not require a through-hole include means for measuring change in gas supply pressure from a difference between measurement values of an absolute pressure sensor that measures atmospheric pressure and an absolute pressure sensor that measures gas pressure.

Unfortunately, driving the two sensors increases power consumption, and thus causing a problem that the gas safety device, which is typically driven by a battery, is required to increase capacity of the battery.

SUMMARY OF THE INVENTION

A gas safety device according to the present disclosure includes a flow path for allowing gas to flow, a flow rate measurement unit for measuring a flow rate of the gas flowing through the flow path, a first pressure sensor disposed inside the flow path to measure absolute pressure of the gas, a second pressure sensor disposed outside the flow path to measure absolute pressure of atmospheric pressure, and a pressure value transition detector that detects a transition state of the absolute pressure measured by the first pressure sensor or the second pressure sensor. The gas safety device also includes a sensor drive controller that controls driving of the first pressure sensor or the second pressure sensor according to a transition value of the pressure value transition detector, and a gas pressure determination unit that calculates gas supply pressure from a difference between pressure values measured when the first pressure sensor and the second pressure sensor are both driven. The gas safety device further includes a shutoff valve that shuts off the flow path, and a control circuit that controls the flow rate measurement unit and causes the shutoff valve to shut off the flow path when determining anomaly from the flow rate measured by the flow rate measurement unit or the gas supply pressure calculated by the gas pressure determination unit.

The present disclosure enables a gas safety device preventing gas from being ejected even at high temperature around the gas safety device to reduce power consumption even when two absolute pressure sensors are provided.

DESCRIPTION OF EMBODIMENTS

Hereinafter, exemplary embodiments will be described in detail with reference to the drawings. However, an unnecessarily detailed description may be eliminated.

First Exemplary Embodiment

Hereinafter, a first exemplary embodiment will be described with reference to FIGS. 1 and 2.

Figure 1:
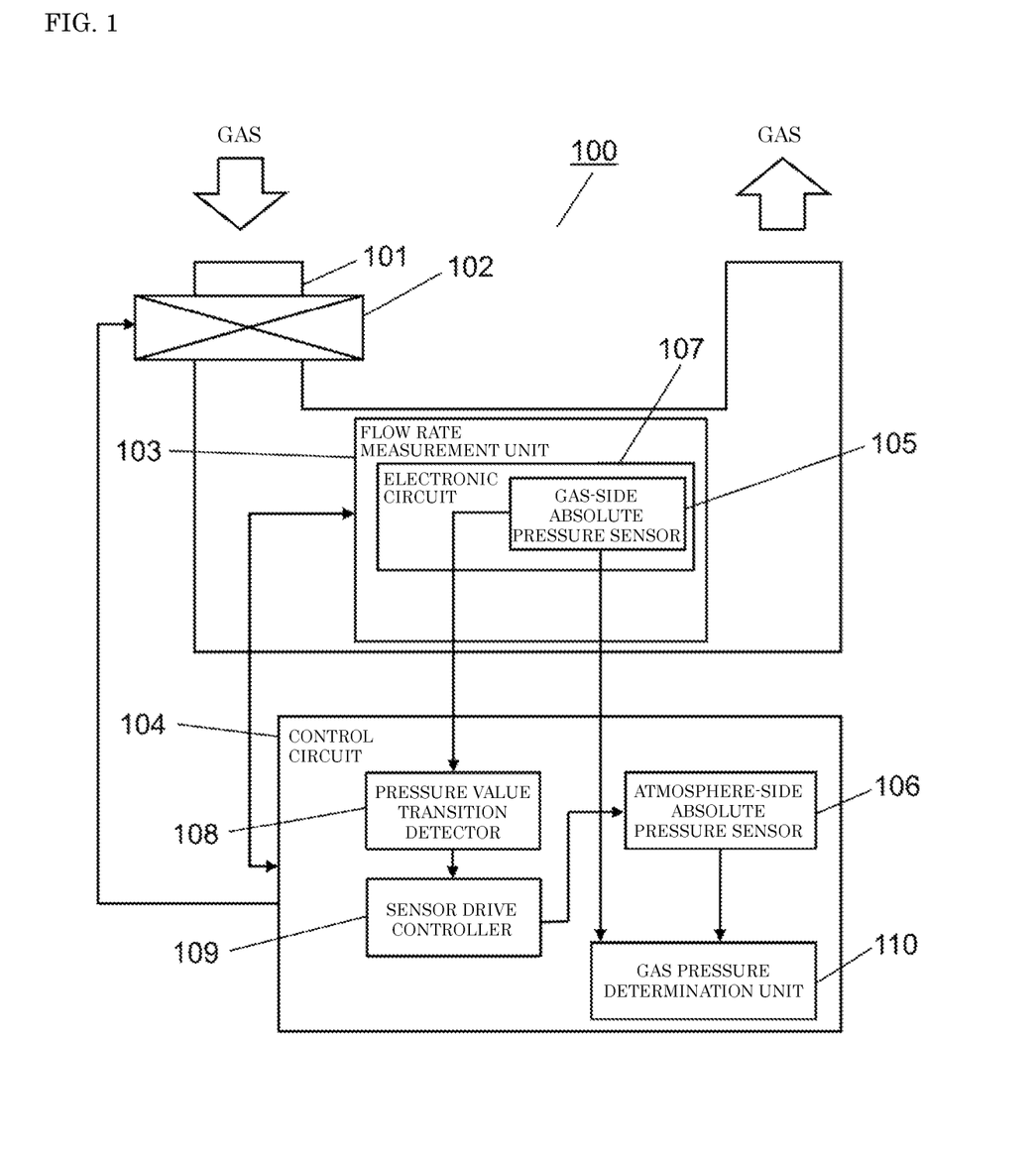
FIG. 1 is a configuration diagram of a gas safety device according to a first exemplary embodiment.

FIG. 1 illustrates gas safety device 100 including: flow path 101 through which gas flows; shutoff valve 102 that shuts off flow path 101; flow rate measurement unit 103 that measures a flow rate of the gas flowing through flow path 101; and control circuit 104 that integrates the amount of gas usage using flow rate measurement data measured by flow rate measurement unit 103. Gas safety device 100 also includes gas-side absolute pressure sensor 105 being a first pressure sensor that measures absolute pressure of gas, atmosphere-side absolute pressure sensor 106 being a second pressure sensor that measures absolute pressure of atmosphere, electronic circuit 107 installed in gas atmosphere, and pressure value transition detector 108 that detects an absolute pressure transition state measured by gas-side absolute pressure sensor 105. Gas safety device 100 further includes sensor drive controller 109 that controls driving of atmosphere-side absolute pressure sensor 106 in accordance with a transition state of pressure values detected by pressure value transition detector 108, and gas pressure determination unit 110 that calculates gas supply pressure from a difference between two pressure values measured by gas-side absolute pressure sensor 105 and atmosphere-side absolute pressure sensor 106.

Gas-side absolute pressure sensor 105 being the first pressure sensor is mounted as an electronic component on electronic circuit 107 installed in gas atmosphere inside flow path 101, and measures absolute pressure of the gas in flow path 101 using a signal from control circuit 104. Atmosphere-side absolute pressure sensor 106 being the second pressure sensor is mounted as an electronic component on control circuit 104 installed on an atmospheric side outside flow path 101, and measures atmospheric absolute pressure using a signal from control circuit 104.

Next, specific operation of pressure value transition detector 108 and sensor drive controller 109 will be described with reference to FIG. 2.

Figure 2:
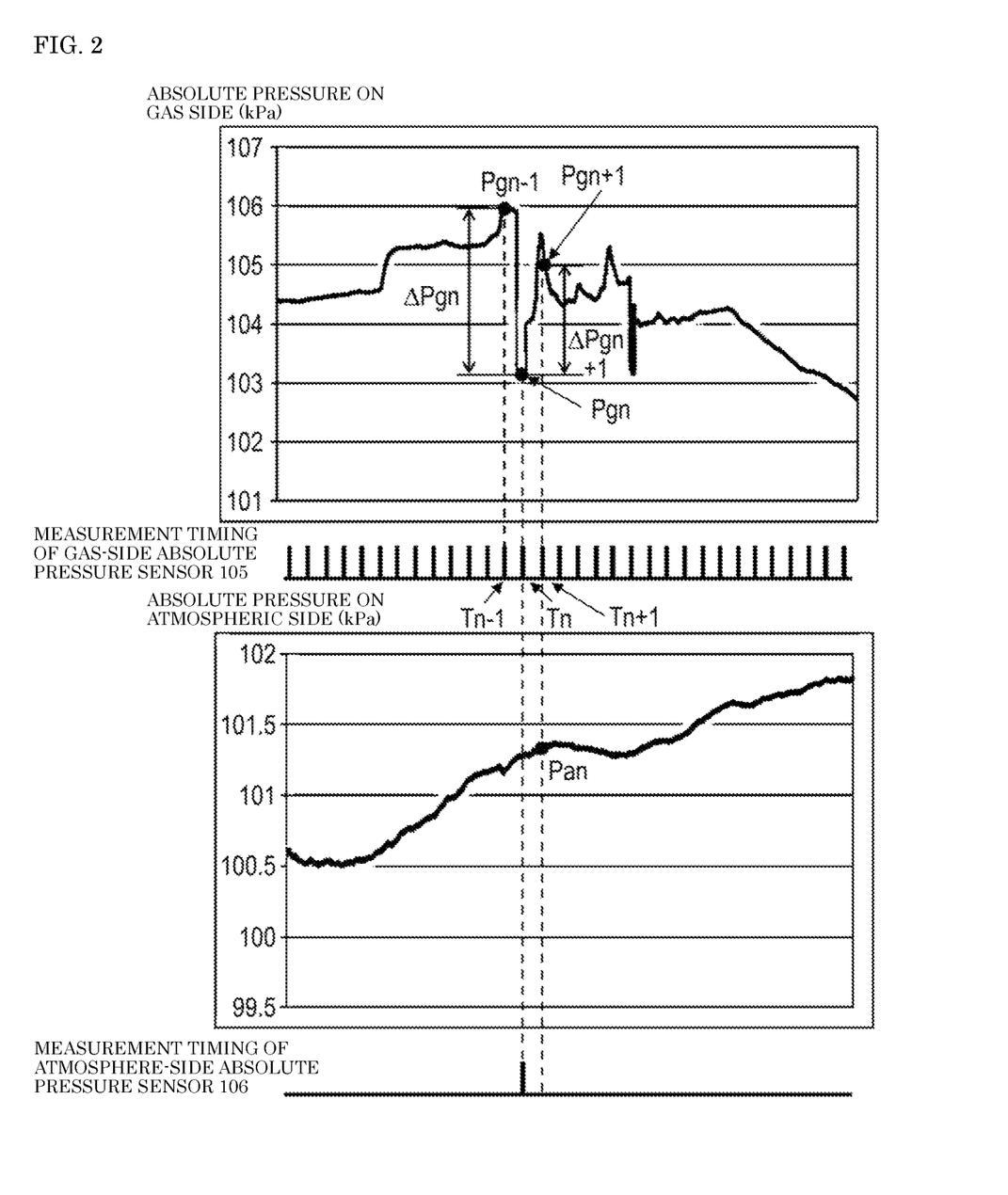
FIG. 2 is an explanatory diagram of operation of the gas safety device according to the first exemplary embodiment.

FIG. 2 illustrates an example of change in absolute pressure on a gas side and in absolute pressure on the atmospheric side, and of measurement timing of gas-side absolute pressure sensor 105 being the first pressure sensor and atmosphere-side absolute pressure sensor 106 being the second pressure sensor, in an identical period.

As illustrated in FIG. 2, gas-side absolute pressure sensor 105 is always driven at predetermined intervals (e.g., two seconds to ten seconds) to perform measurement. That is, the predetermined intervals are intervals of the measurement timing of gas-side absolute pressure sensor 105. When gas-side pressure value transition detector 108 detects that absolute pressure measured by gas-side absolute pressure sensor 105 has changed by a predetermined value (e.g., 2 kPa) or more, sensor drive controller 109 drives atmosphere-side absolute pressure sensor 106 to measure pressure on the atmospheric side. Then, when the change in the absolute pressure measured by gas-side absolute pressure sensor 105 is less than the predetermined value, the measurement is stopped without driving atmosphere-side absolute pressure sensor 106.

That is, pressure change at each predetermined interval is less than 2 kPa until measurement timing $T_{n-1}$ of gas-side absolute pressure sensor 105, so that atmosphere-side absolute pressure sensor 106 is not driven. However, pressure difference $\Delta P_{gn}$ between absolute pressure $P_{gn-1}$ at measurement timing $T_{n-1}$ and absolute pressure $P_{gn}$ at measurement timing $T_n$ is 2 kPa or more, and atmosphere-side absolute pressure sensor 106 is driven to measure atmospheric absolute pressure $P_{an}$ at measurement timing $T_n$. Then, at next measurement timing $T_{n+1}$, pressure difference $\Delta P_{gn+1}$ between absolute pressure $P_{gn}$ at measurement timing $T_n$ using gas-side absolute pressure sensor 105 and absolute pressure $P_{gn+1}$ at measurement timing $T_{n+1}$ is less than 2 kPa, and thus driving of atmosphere-side absolute pressure sensor 106 is stopped. After that, pressure change at each measurement timing of gas-side absolute pressure sensor 105 is less than 2 kPa, so that driving of atmosphere-side absolute pressure sensor 106 is stopped.

Thus, when gas-side absolute pressure sensor 105 measures absolute pressure $P_{gn}$ on the gas side and atmosphere-side absolute pressure sensor 106 measures absolute pressure $P_{an}$ on the atmosphere side at measurement timing $T_n$, gas pressure determination unit 110 can calculate gas supply pressure from a difference between the two measured pressure values. Control circuit 104 determines the flow rate measurement data measured by flow rate measurement unit 103, the gas supply pressure, and change in the gas supply pressure to determine whether there is an anomaly such as gas leakage. When determining that there is an anomaly, control circuit 104 causes shutoff valve 102 to shut off flow path 101 to stop gas supply.

As described above, in the present exemplary embodiment, only gas-side absolute pressure sensor 105 being the first pressure sensor usually measures absolute pressure on the gas side, and driving and stopping of atmosphere-side absolute pressure sensor 106 being the second pressure sensor are controlled depending on whether a predetermined pressure change or more is detected. Such a configuration allows fluctuation of gas supply pressure to be detected using a difference between pressure values detected by the two absolute pressure sensors capable of reducing power consumption and measuring absolute pressure, so that a through-hole necessary for using a pressure sensor of a differential pressure measurement type is unnecessary, and thus a highly safe gas safety device can be fabricated.

Although in the present exemplary embodiment, pressure value transition detector 108 uses a method for detecting a pressure difference between measurement timings using gas-side absolute pressure sensor 105, available methods include a method for detecting a pressure transition using a pressure difference between separated measurement timings, an average pressure difference of a plurality of measurement timings, a change pattern, or the like.

Although the present exemplary embodiment describes the configuration in which gas-side absolute pressure sensor 105 measures pressure to control stopping and driving of atmosphere-side absolute pressure sensor 106, it is needless to say that a configuration in which stopping and driving of gas-side absolute pressure sensor 105 are controlled on the basis of pressure measurement of atmosphere-side absolute pressure sensor 106 can be equivalent to the configuration above.

It is needless to say that even when flow rate measurement unit 103 is used for ultrasonic flow rate measurement in the present exemplary embodiment, an equivalent measurement can be performed.

Although the present exemplary embodiment describes the structure in which gas-side absolute pressure sensor 105 is mounted on electronic circuit 107 installed in the gas atmosphere inside flow path 101, it is needless to say that absolute pressure sensor 105 may be mounted anywhere inside flow path 101. Although the structure is described in which atmosphere-side absolute pressure sensor 106 is mounted on control circuit 104 installed on the atmospheric side outside flow path 101, a mounting place is not limited as long as atmospheric pressure can be measured.

Second Exemplary Embodiment

Figure 3:
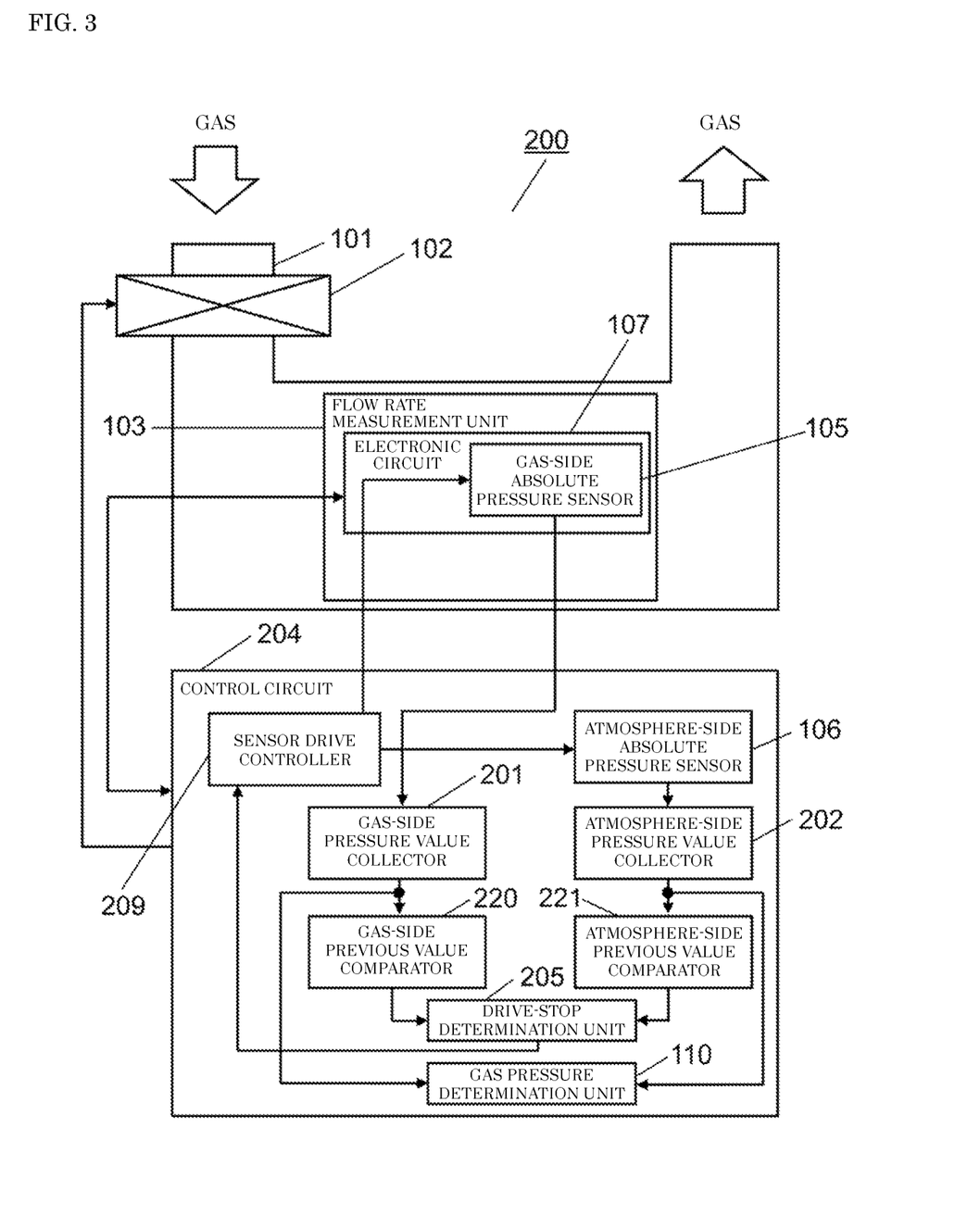
FIG. 3 is a configuration diagram of a gas safety device according to a second exemplary embodiment.

Hereinafter, a second exemplary embodiment will be described with reference to FIGS. 3 to 4. In FIG. 3, the same components described in FIG. 1 are denoted by the same reference numerals, and duplicated description thereof is eliminated.

Gas safety device 200 includes flow path 101, shutoff valve 102, flow rate measurement unit 103 that measures a flow rate of the gas flowing through flow path 101, and control circuit 204 that integrates the amount of gas usage using flow rate measurement data measured by flow rate measurement unit 103. Gas safety device 200 also includes gas-side absolute pressure sensor 105 being a first pressure sensor, atmosphere-side absolute pressure sensor 106 being a second pressure sensor, electronic circuit 107 installed in gas atmosphere, and sensor drive controller 209 that controls driving of gas-side absolute pressure sensor 105 and atmosphere-side absolute pressure sensor 106. Gas safety device 200 also includes a gas-side pressure value collector 201 that collects a pressure value measured by gas-side absolute pressure sensor 105 n times, and atmosphere-side pressure value collector 202 that collects a pressure value measured by atmosphere-side absolute pressure sensor 106 n times. Gas safety device 200 further includes gas-side previous value comparator 220 that compares a previous pressure value and a current pressure value that are obtained by gas-side pressure value collector 201, atmosphere-side previous value comparator 221 that compares a previous pressure value and a current pressure value that are obtained by atmosphere-side pressure value collector 202, and drive-stop determination unit 205 that determines stop of driving gas-side absolute pressure sensor 105 and atmosphere-side absolute pressure sensor 106 from results of gas-side previous value comparator 220 and atmosphere-side previous value comparator 221. Gas safety device 200 further includes gas pressure determination unit 110 that calculates gas supply pressure from a difference between an absolute pressure value collected by gas-side pressure value collector 201 and an absolute pressure value collected by atmosphere-side pressure value collector 202.

Next, specific operation will be described with reference to FIG. 4. The same components described in FIGS. 1 and 3 are denoted by the same reference numerals.

Figure 4:
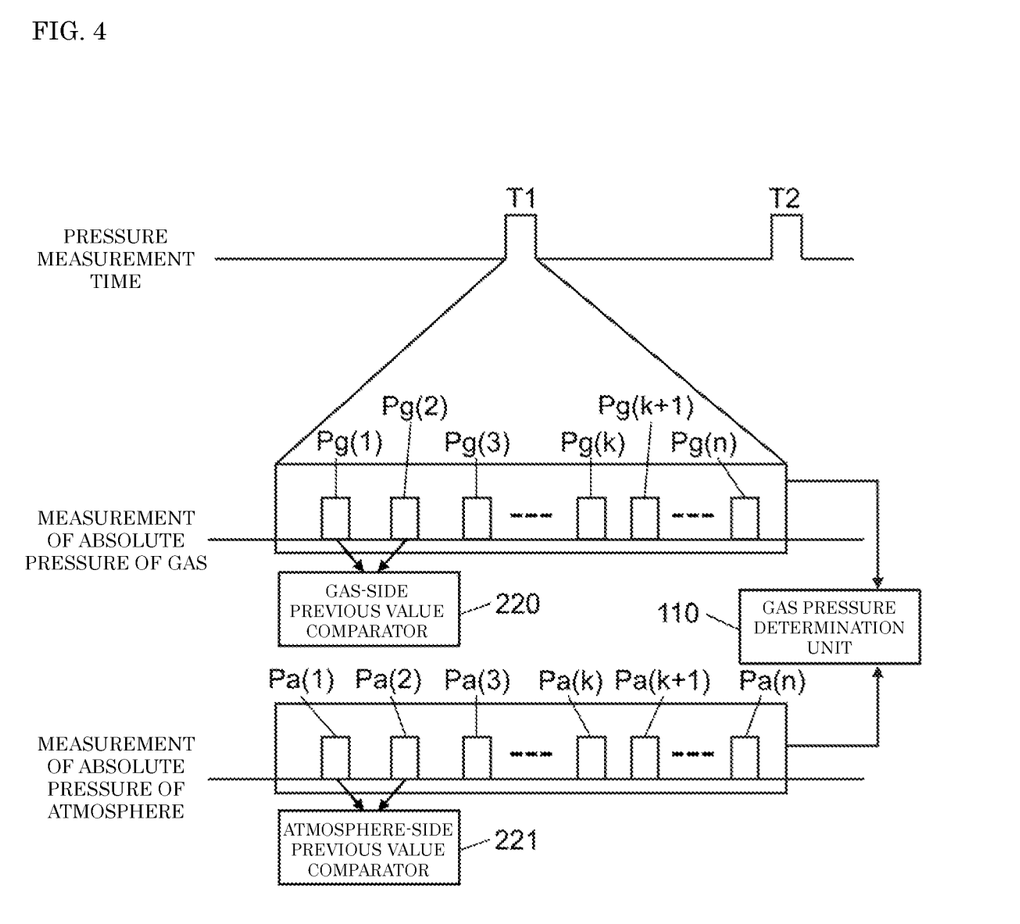
FIG. 4 is an explanatory diagram of operation of the gas safety device according to the second exemplary embodiment.

As illustrated in FIG. 4, gas pressure determination unit 110 periodically measures pressure at predetermined time intervals T (e.g., two seconds to ten seconds). FIG. 4 illustrates pressure measurement times T1 and T2 that each indicate timing of pressure measurement. At pressure measurement time T1, gas-side pressure value collector 201 collects absolute pressure values from pressure value Pg(1) measured first to pressure value Pg(n) measured at a maximum n-th time by gas-side absolute pressure sensor 105 at predetermined intervals (e.g., 5 ms). Atmosphere-side pressure value collector 202 collects absolute pressure values from pressure value Pa(1) measured first to pressure value Pa(n) measured at a maximum n-th time by atmosphere-side absolute pressure sensor 105 at the same timing as gas-side absolute pressure sensor 106.

When gas-side pressure value collector 201 collects a pressure value at the second time, gas-side previous value comparator 220 compares first pressure value Pg(1) with second pressure value Pg(2), and thereafter, every time a measurement value is collected, gas-side previous value comparator 220 compares the measurement value with the previous value. Similarly, when atmosphere-side pressure value collector 202 collects second pressure value Pa(2), atmosphere-side previous value comparator 221 compares first pressure value Pa(1) with second pressure value Pa(2), and thereafter, every time a pressure value is collected, atmosphere-side previous value comparator 221 compares the pressure value with the previous pressure value.

When it is determined that the pressure values on the gas side and the atmosphere side are both stably measured as a result of comparisons using gas-side previous value comparator 220 and atmosphere-side previous value comparator 221, drive-stop determination unit 205 stops driving gas-side absolute pressure sensor 105 and atmosphere-side absolute pressure sensor 106.

That is, in the middle of n times measurements, when it is determined that not only a pressure value on the gas side is stable by comparison between pressure value Pg(k) on the gas side in the k-th measurement and pressure value Pg(k+1) on the gas side in the (k+1)-th measurement, but also a pressure value on the atmosphere side is stable by comparison between pressure value Pa(k) on the atmosphere side in the k-th measurement and pressure value Pa(k+1) on the atmosphere side in the (k+1)-th measurement, the (k+2)-th and subsequent measurements are stopped.

It is determined whether a pressure value is stably measured by determining whether a difference between a pressure value acquired this time and a pressure value acquired last time is smaller than a predetermined value. The predetermined value may be equal or set individually on each of the gas side and the atmosphere side.

Gas pressure determination unit 110 calculates gas supply pressure from a difference between a pressure value on the gas side in the (k+1)-th measurement with gas-side pressure value collector 201 when it is determined that measured pressure values are stable and a pressure value on the atmosphere side in the (k+1)-th measurement acquired by atmosphere-side pressure value collector 202. Then, control circuit 204 determines whether there is an anomaly such as gas leakage by determining flow-rate measurement data measured by flow rate measurement unit 103, gas supply pressure, and change in the gas supply pressure. When determining that there is an anomaly, control circuit 204 causes shutoff valve 102 to shut off flow path 101 to stop supplying the gas.

When it is determined that pressure values are unstable even after n repetitions as a result of comparisons using gas-side previous value comparator 220 and atmosphere-side previous value comparator 221 at pressure measurement time T1, as a result, gas pressure determination unit 110 does not calculate gas supply pressure from a difference between two absolute pressure values at pressure measurement time T1. Operation similar to that described above is also performed at pressure measurement time T2.

As described above, although in the present exemplary embodiment, measurements are performed by driving two absolute pressure sensors (gas-side absolute pressure sensor 105 being the first pressure sensor and atmosphere-side absolute pressure sensor 106 being the second pressure sensor) at predetermined time intervals T, power consumption can be reduced due to control of driving and stopping of the two absolute pressure sensors, the control being performed by determining whether pressure values measured by the two absolute pressure sensors are stable.

That is, when measured values are unstable due to an external factor such as noise, an accurate pressure value can be measured by performing measurement until the measured values become stable. Since noise or the like due to an external factor temporarily occurs, thus, in normal measurement without noise or the like, a number of times of driving the absolute pressure sensor in one pressure measurement time can be reduced, so that power consumption can be greatly reduced.

Additionally, a through-hole required for using a pressure sensor of a differential pressure measurement type becomes unnecessary, so that a gas safety device with higher safety can be fabricated.

Although in the present exemplary embodiment, gas-side previous value comparator 220 and atmosphere-side previous value comparator 221 have been described as a method for comparing two measurement results at the previous time and the current time, it is needless to say that the same can be performed when drive-stop determination unit 205 performs sensor drive control by comparing an average of values at multiple times up to the previous time and a measurement value at the current time.

Although the present exemplary embodiment describes the structure in which gas-side absolute pressure sensor 105 is mounted on electronic circuit 107 installed in the gas atmosphere inside flow path 101, it is needless to say that gas-side absolute pressure sensor 105 may be mounted anywhere inside flow path 101. Although the structure is described in which atmosphere-side absolute pressure sensor 106 is mounted on control circuit 104 installed on the atmospheric side outside flow path 101, a mounting place is not limited as long as atmospheric pressure can be measured.

As described above, a first disclosure includes a flow path for allowing gas to flow, a flow rate measurement unit for measuring a flow rate of the gas flowing through the flow path, a first pressure sensor disposed inside the flow path to measure absolute pressure of the gas, and a second pressure sensor disposed outside the flow path to measure absolute pressure of atmospheric pressure. Further provided are a pressure value transition detector that detects a transition state of absolute pressure measured by the first pressure sensor or the second pressure sensor, and a sensor drive controller that controls driving of the first pressure sensor or the second pressure sensor based on a transition value of the pressure value transition detector. Further provided are a gas pressure determination unit that calculates gas supply pressure from a difference between pressure values measured when the first pressure sensor and the second pressure sensor are both driven, a shutoff valve that shuts off the flow path, and a control circuit that controls the flow rate measurement unit and causes the shutoff valve to shut off the flow path when determining anomaly from the flow rate measured by the flow rate measurement unit or the gas supply pressure calculated by the gas pressure determination unit.

This configuration enables reducing power consumption by reducing the driving of the atmosphere-side absolute pressure sensor. Additionally, a through-hole required for using a pressure sensor of a differential pressure measurement type becomes unnecessary, and gas can be prevented from being ejected even at high temperature around the gas safety device, thereby enabling a gas safety device with higher safety to be fabricated.

A second disclosure may be configured particularly in the first disclosure such that the flow rate measurement unit includes a measurement circuit disposed inside the flow path, the first pressure sensor is formed on the measurement circuit, the control circuit is disposed outside the flow path, and the second pressure sensor is disposed on the control circuit.

A third disclosure may be configured particularly in the first or second disclosure such that the flow rate measurement unit includes an ultrasonic flow rate measurement unit in which an ultrasonic sensor and a measurement circuit that drives the ultrasonic sensor to measure a flow rate are integrated, the ultrasonic flow rate measurement unit is installed in gas atmosphere, the ultrasonic flow rate measurement unit includes the first pressure sensor, and the control circuit controls the ultrasonic flow rate measurement unit to also control the first pressure sensor on an ultrasonic sensor drive circuit.

A fourth disclosure includes a flow path for allowing gas to flow, a flow rate measurement unit for measuring a flow rate of the gas flowing through the flow path, a first pressure sensor disposed inside the flow path to measure absolute pressure of the gas, and a second pressure sensor disposed outside the flow path to measure absolute pressure of atmospheric pressure. Provided are a first pressure value collector that collects n values of absolute pressure measured by the first pressure sensor, and a second pressure value collector that collects n values of absolute pressure measured by the second pressure sensor. Further provided are a first pressure previous value comparator that compares a current measurement value and a previous measurement value obtained by the first pressure value collector, a second pressure previous value comparator that compares a current measurement value and a previous measurement value obtained by the second pressure value collector, and a drive-stop determination unit that determines stop of driving the sensors from results of the first pressure previous value comparator and the second pressure previous value comparator. Further provided are a gas pressure determination unit that calculates gas supply pressure from a difference between absolute pressures measured by the first pressure value collector and the second pressure value collector, a shutoff valve that shuts off the flow path, and a control circuit that controls the flow rate measurement unit and causes the shutoff valve to shut off the flow path when determining anomaly from the flow rate measured by the flow rate measurement unit or the gas supply pressure calculated by the gas pressure determination unit.

This configuration enables reducing power consumption by reducing the driving of the two absolute pressure sensors. Additionally, a through-hole required for using a pressure sensor of a differential pressure measurement type becomes unnecessary, and gas can be prevented from being ejected even at high temperature around the gas safety device, thereby enabling a gas safety device with higher safety to be fabricated.

A fifth disclosure may be configured particularly in the fourth disclosure such that the flow rate measurement unit includes a measurement circuit disposed inside the flow path, the first pressure sensor is formed on the measurement circuit, the control circuit is disposed outside the flow path, and the second pressure sensor is disposed on the control circuit.

A sixth disclosure may be configured particularly in the fourth or fifth disclosure such that the flow rate measurement unit includes an ultrasonic flow rate measurement unit in which an ultrasonic sensor and a measurement circuit that drives the ultrasonic sensor to measure a flow rate are integrated, the ultrasonic flow rate measurement unit is installed in gas atmosphere, the ultrasonic flow rate measurement unit includes a first pressure sensor, and the control circuit controls the ultrasonic flow rate measurement unit to also control the first pressure sensor on an ultrasonic sensor drive circuit.

INDUSTRIAL APPLICABILITY

The present disclosure enables not only improving safety of a gas safety device but also fabricating an inexpensive gas safety device, and can be applied to applications such as gas meters for general household and business.

REFERENCE MARKS IN THE DRAWINGS 100, 200 gas safety device
101 flow path
102 shutoff valve
103 flow rate measurement unit
104, 204 control circuit
105 gas-side absolute pressure sensor (first pressure sensor)
106 atmosphere-side absolute pressure sensor (second pressure sensor)
107 electronic circuit (measurement circuit)
108 pressure value transition detector
109, 209 sensor drive controller
110 gas pressure determination unit
201 gas-side pressure value collector (first pressure value collector)
202 atmosphere-side pressure value collector (second pressure value collector)
205 drive-stop determination unit
220 gas-side previous value comparator
221 atmosphere-side previous value comparator

The invention claimed is:

1. A gas safety device comprising:
a flow path for allowing gas to flow;
a flow rate measurement unit configured to measure a flow rate of the gas flowing through the flow path;
a first pressure sensor disposed inside the flow path to measure absolute pressure of the gas;
a second pressure sensor disposed outside the flow path to measure absolute pressure of atmospheric pressure;
a pressure value transition detector configured to detect a transition state of the absolute pressure measured by the first pressure sensor or the second pressure sensor;
a sensor drive controller configured to control driving of the first pressure sensor or the second pressure sensor according to a transition value of the pressure value transition detector;
a gas pressure determination unit configured to calculate gas supply pressure from a difference between pressure values measured when the first pressure sensor and the second pressure sensor are both driven;
a shutoff valve configured to shut off the flow path; and
a control circuit configured to control the flow rate measurement unit and to cause the shutoff valve to shut off the flow path when determining an anomaly from the flow rate measured by the flow rate measurement unit or the gas supply pressure calculated by the gas pressure determination unit.

2. The gas safety device according to claim 1, wherein the flow rate measurement unit includes a measurement circuit disposed inside the flow path,
the first pressure sensor is formed on the measurement circuit,
the control circuit is disposed outside the flow path, and
the second pressure sensor is disposed on the control circuit.

3. The gas safety device according to claim 1, wherein:
the flow rate measurement unit includes an ultrasonic flow rate measurement unit having integrated therein an ultrasonic sensor and a measurement circuit configured to drive the ultrasonic sensor to measure a flow rate,
the ultrasonic flow rate measurement unit is installed in a gas atmosphere,
the ultrasonic flow rate measurement unit includes the first pressure sensor, and
the control circuit controls the ultrasonic flow rate measurement unit to also control the first pressure sensor on an ultrasonic sensor drive circuit.

4. A gas safety device comprising:
a flow path configured to allow gas to flow;
a flow rate measurement unit configured to measure a flow rate of the gas flowing through the flow path;
a first pressure sensor disposed inside the flow path to measure absolute pressure of the gas;
a second pressure sensor disposed outside the flow path to measure absolute pressure of atmospheric pressure;
a first pressure value collector configured to collect n values of absolute pressure measured by the first pressure sensor;
a second pressure value collector configured to collect n values of absolute pressure measured by the second pressure sensor;
a first previous pressure value comparator configured to compare a previous pressure value and a current pressure value that are obtained by the first pressure value collector;
a second previous pressure value comparator configured to compare a previous pressure value and a current pressure value that are obtained by the second pressure value collector;
a drive-stop determination unit configured to determine a stop of driving a sensor from results of the first previous pressure value comparator and the second previous pressure value comparator;
a gas pressure determination unit configured to calculate a gas supply pressure from a difference between an absolute pressure value collected by the first pressure value collector and an absolute pressure value collected by the second pressure value collector;
a shutoff valve configured to shut off the flow path; and
a control circuit configured to control the flow rate measurement unit and to cause the shutoff valve to shut off the flow path when determining an anomaly from the flow rate measured by the flow rate measurement unit or the gas supply pressure measured by the gas pressure determination unit.

5. The gas safety device according to claim 4, wherein the flow rate measurement unit includes a measurement circuit disposed inside the flow path,
the first pressure sensor is formed on the measurement circuit,
the control circuit is disposed outside the flow path, and
the second pressure sensor is disposed on the control circuit.

6. The gas safety device according to claim 4, wherein:
the flow rate measurement unit includes an ultrasonic flow rate measurement unit having integrated therein an ultrasonic sensor and a measurement circuit configured to drive the ultrasonic sensor to measure a flow rate,
the ultrasonic flow rate measurement unit is installed in a gas atmosphere,
the ultrasonic flow rate measurement unit includes the first pressure sensor, and
the control circuit is configured to control the ultrasonic flow rate measurement unit to also control the first pressure sensor on an ultrasonic sensor drive circuit.

* * * * *